Jan. 11, 1944.  F. J. LINGEL  2,339,021
ELECTRICAL TRANSLATING INSTRUMENT
Filed Nov. 20, 1939  2 Sheets-Sheet 1
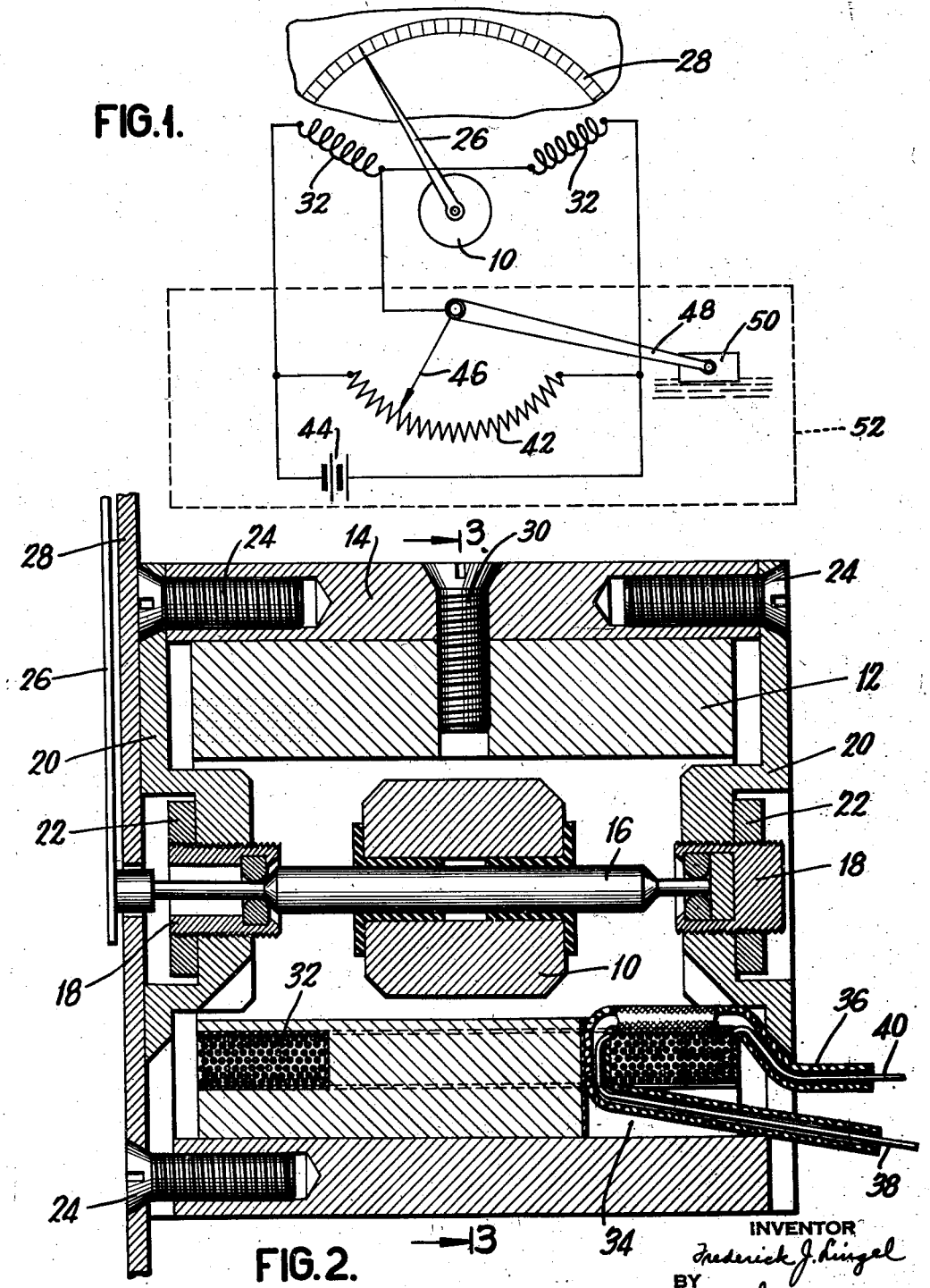

Jan. 11, 1944.  F. J. LINGEL  2,339,021
ELECTRICAL TRANSLATING INSTRUMENT
Filed Nov. 20, 1939  2 Sheets-Sheet 2

NON-MAGNETIC
COIL MOUNT AND
DAMPER

POLARIZED
BIASING MAGNETIC
SHIELD, CASING AND
FLUX RETURN PATH

INVENTOR
Frederick J. Lingel
BY
Cooper, Kerr & Dunham
ATTORNEYS

Patented Jan. 11, 1944

2,339,021

UNITED STATES PATENT OFFICE 2,339,021

ELECTRICAL TRANSLATING INSTRUMENT

Frederick J. Lingel, Long Island City, N. Y., assignor to The Liquidometer Corporation, Long Island City, N. Y., a corporation of Delaware Application November 20, 1939, Serial No. 305,255

6 Claims. (Cl. 171—95)

This invention relates to electromagnetic translating devices. More specifically, it relates to indicating instruments.

Some of the important objects of the invention are to provide devices of the type described which are compact, efficient and reliable in operation, comparatively simple in construction, and which may be readily assembled and dis-assembled.

Other objects and advantages of my invention will appear to those skilled in the art upon reading the following description of the invention and of the manner and process of making, constructing, compounding, and using it, and I shall also explain herein what I now believe to be the principle thereof, and the best mode in which I have contemplated applying that principle.

Desiring to have it understood that my invention may be carried out by other means and with other apparatus, and that it may be used in other environments and for other purposes, I shall now proceed to describe what I now consider to be a preferred form of apparatus for practicing the invention.

Referring to the drawings:

Fig. 1 is a wiring diagram showing one of many forms of electrical connections that may be used with my invention.

Fig. 2 is a section taken on a plane through the axis of an instrument embodying my invention.

Figure 3:
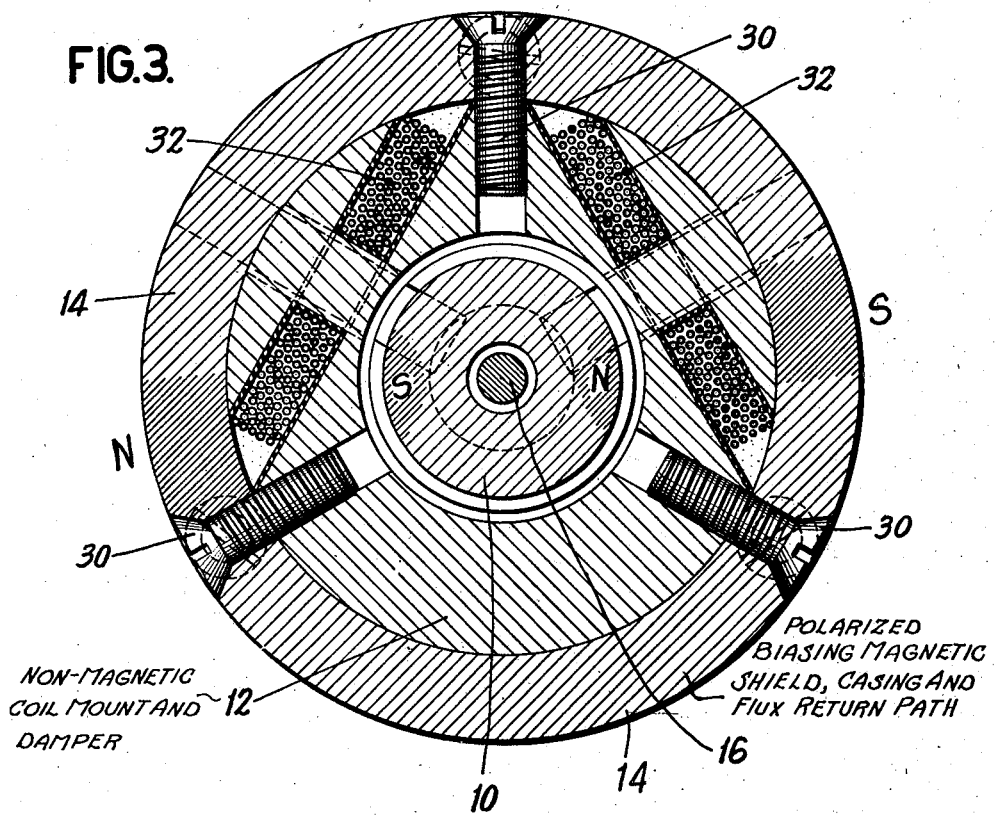
Fig. 3 is a section taken on the line 3—3 of Fig. 2.

The particular instrument shown is a ratio meter. It comprises a rotor or armature 10, which is permanently magnetized or poled transversely with respect to its axis of rotation or oscillation, a combined coil mount and damper 12, and a casing 14 which constitutes also a flux return path, magnetic shield, bearing support, and zero biasing means.

The rotor 10 is preferably cylindrical and made of high coercive force material, such as Alnico, and is permanently magnetized so as to have a north pole on one side of the cylinder and a south pole on the other side substantially diametrically opposed to the north pole. The rotor 10 is secured to a shaft 16 coaxial with the rotor and rotatably mounted in bearings 18, 18, carried by the end plates 20, 20. Each of the bearings is longitudinally adjustable in its plate 20, as by being screw threadedly connected therewith, lock nuts 22, 22 being provided for holding the bearings in any position to which the bearings have been adjusted. Any rotation or oscillation of the rotor 10 produces corresponding movement of the shaft 16. The end plates 20, 20, are each detachably secured to a corresponding end of the casing 14 by means of screws 24.

While other forms of indicating means, such as a recording couple, may be utilized, I have shown an indicating couple consisting of a pointer 26 secured to a prolongation of the shaft 16 and a suitably calibrated dial or scale 28, secured to the casing 14 by the screws 24 of one of the end plates.

Figure 4:
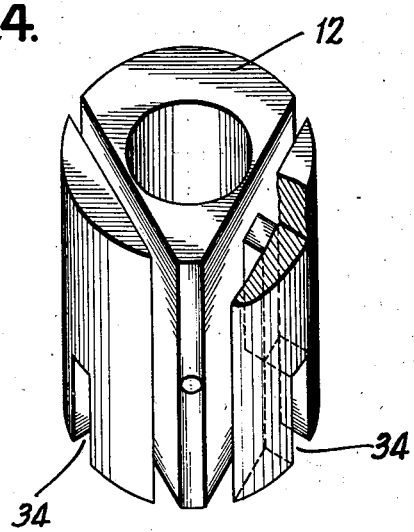
Fig. 4 is a detail view of a part of the instrument shown in Figs. 2 and 3.

The coil mount 12 is constructed of a non-magnetic metal, such as brass, surrounds the rotor 10 and is surrounded by the casing 14 to which it is detachably secured by radially extending screws 30. The number of coils employed depends upon the particular use to which the instrument is to be put. For example, if pointer rotation of 360° or more were desired, three or more coils equiangularly spaced about the rotor 10 would be employed. However, the particular instrument illustrated comprises two coils 32, 32, each so mounted that its flux axis intersects and is at a right angle to the axis of rotation of the rotor 10 and so that the flux axes of the coils intersect each other at an angle of 120°. The coil mount 12 is substantially of the shape of a hollow cylinder and is slotted or cut away as shown (see especially Fig. 4) to form spools upon which the coils 32, 32 are wound. Each spool portion of the coil mount 12 is provided with a slot 34 (see Figs. 2 and 4) through which the leads of the coil, mounted on that spool portion, extend. Before winding the coils on the spool portions, the coil mount 12, or at least each spool portion thereof, is dipped in insulating material, such as bakelite shellac or the like, which is then set or solidified by heating.

In winding, the starting end 38 of each coil 32 is stuck through the wall of a piece of flexible insulating tubing 36, such as a fabric tube or sleeve, mounted in the slot 34. After each coil has been wound, its finishing end 40 is stuck through the wall of the sleeve 36 so that the parts then appear as shown in the lower right hand portion of Fig. 2. The sleeves 36 thus provide quite satisfactory insulation, protection, and reinforcement for the leads of the coils.

The casing 14 is preferably made of cold rolled steel which is annealed after it has been machined. The casing is permanently magnetized or poled so as to have a north pole at one side and a diametrically opposed south pole on the other side, the poling being such that it will bias the permanently magnetized rotor 10 toward a zero or neutral position and cause it to occupy that position when the coils are both deenergized.

It will be noted that each of the coils 32, 32 is embedded in the coil mount 12 and lies wholly to one side of the rotor 10. This facilitates assembly and disassembly of the instrument including insertion of the rotor 10 into, and removal of the rotor 10 from, the instrument, without removing or in any way interfering with the coils 32, 32.

One of the numerous uses to which the instrument may be put is illustrated in Fig. 1. The coils 32, 32 are there shown connected in a bridge circuit including a resistance or rheostat 42 and energized by a scource of E. M. F. 44. The arm or slide 46 of the rheostat is mechanically connected to the arm 48 of a float 50 in a float chamber 52. As the liquid level rises and falls, the arm 46 is thereby moved in one direction or the other to weaken the energization of one of the coils 32 and strengthen the energization of the other coil 32. The resultant of the magnetic flux set up by the coils 32, 32, and consequently the angular position of the permanently magnetized rotor 10, occupies an angular position about the rotor axis depending upon the relative strength of the currents flowing through the two coils. The scale 28 may therefore be calibrated so that the pointer 26 will indicate thereon the depth of liquid in the float chamber 52. It will be understood, of course, that the indicating instrument may be placed remotely with respect to float chamber 52.

The coil mount 12 serves as an effective low resistance eddy current damper for the rotor 10. Particularly is this so since this non-magnetic metallic coil mount occupies the space between the rotor 10 and the casing 14 except for the comparatively small portion thereof occupied by the coils 32, 32 embedded in the coil mount.

The casing 14 functions also as a support for the end plates and bearings, as a return path for the magnetic flux, as a magnetic shield, and as a biasing device for the rotor 10.

The instrument may be easily constructed, assembled, and disassembled.

The instrument may be made quite compact and small. I have constructed a highly satisfactory indicating instrument embodying the invention in which the outside diameter of the casing 14 is three-fourths of an inch and in which the distance between the end plates 20, 20 is three-fourths of an inch.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is designed to use the various features and elements in the combinations and relations described, some of these may be altered and others omitted, without interfering with the more general results outlined, and the invention extends to such use within the scope of the appended claims.

What I claim is:

1. A current-responsive instrument comprising, in combination, a permanent magnet of relatively high coercive force material substantially symmetrical about an axis and magnetized transversely thereto, a current conducting coil, said magnet and said coil being mounted to permit relative motion between said coil and said magnet about said axis, a magnetic shield spaced from and surrounding said permanent magnet, said coil lying wholly outside the periphery and to one side of said magnet and occupying a portion of the space between said shield and magnet, and a hollow metallic substantially cylindrical member constituting both an eddy current damper and coil mount substantially coaxial with said permanent magnet and occupying a greater portion of the space between said shield and said magnet, said coil being mounted in and carried by said coil mount and being mounted substantially entirely within the periphery of said coil mount; and the permeability of the magnetic-flux-transmitting medium surrounded by said coil being substantially unity throughout the entire area enclosed by the coil.

2. A ratio instrument comprising, in combination, an armature consisting of a cylinder of relatively high coercive force material polarized across a diameter thereof and pivoted for rotation on its cylindrical axis, a stationary cylinder of non-magnetic conducting material surrounding said armature for damping said armature and constituting a coil mount, a pair of stationary coils positioned to produce fluxes across the axis of said armature at an angle to each other such that the armature is positioned by the resultant flux of said coils, said coils each lying wholly outside the periphery and to one side of said armature, and a cylindrical magnetic shield surrounding said instrument, said coils being mounted in and carried by said coil mount and being mounted substantially entirely within the periphery of said cylinder of non-magnetic conducting material; the permeability of the magnetic-flux-transmitting medium surrounded by each of said coils being substantially unity throughout the entire cross-sectional area enclosed by the coil.

3. A current-responsive instrument comprising, in combination, a permanent magnet of relatively high coercive material mounted for rotation about an axis and magnetized transversely thereto, a substantially cylindrical metallic damping member substantially coaxial with said magnet and having a bore in which said magnet is located, a stationary deflecting coil mounted in and carried by said damping member wholly outside the periphery and to one side of the bore of said damping member and having its flux axis substantially at right angles to the axis of rotation of said magnet, and a permanently magnetized magnetic shield surrounding said first mentioned magnet, said damping member, and said coil, for biasing said first mentioned magnet to a predetermined position, the permeability of the magnetic-flux-transmitting medium surrounded by said coil being substantially unity throughout the entire area enclosed by the coil.

4. In an instrument of the class described, in combination, a substantially cylindrical metallic non-magnetizable coil mount having a substantially cylindrical bore adapted to receive a substantially cylindrical rotor, said coil mount having slots forming a plurality of radially extending spool portions between the bore and periphery thereof, and a plurality of coils each wound in the slot of a corresponding one of said spools and wholly outside the periphery and to one side of the bore of said coil mount whereby a rotor may be inserted into and withdrawn from the bore of said coil mount without disturbing said coils.

5. The combination specified in claim 10 and in which the coil mount is provided with a plurality of lead-receiving slots, one for each coil, and in each of which slots the starting and finishing ends of the corresponding coil are inserted through a flexible insulating sleeve looped through and around one side of that coil.

6. A current-responsive instrument comprising, in combination, a permanent magnet of relatively high coercive force material substantially symmetrical about an axis and magnetized transversely thereto, a current conducting coil, said magnet and said coil being mounted to permit relative motion between said coil and said magnet about said axis, the flux axis of said coil being perpendicular to the first mentioned axis, a magnetic shield spaced from and surrounding said permanent magnet, said coil lying wholly outside the periphery and to one side of said magnet and occupying a portion of the space between said shield and magnet, and a hollow metallic substantially cylindrical coil mount occupying a greater portion of the space between said shield and said magnet, said coil being mounted in and carried by said coil mount and being mounted substantially entirely within the periphery of said coil mount; and the permeability of the magnetic-flux-transmitting medium surrounded by said coil being substantially unity throughout the entire area enclosed by the coil.

FREDERICK J. LINGEL.

CERTIFICATE OF CORRECTION.

Patent No. 2,339,021. January 11, 1944.

FREDERICK J. LINGEL.

It is hereby certified that error appears in the printed specification of the above numbered patent requiring correction as follows: Page 3, first column, line 5, for the claim reference numeral "10" read --4--; and that the said Letters Patent should be read with this correction therein that the same may conform to the record of the case in the Patent Office.

Signed and sealed this 14th day of March, A. D. 1944.

(Seal)

Leslie Frazer
Acting Commissioner of Patents.